US007620888B2

(12) United States Patent
Hirst

(10) Patent No.: US 7,620,888 B2
(45) Date of Patent: Nov. 17, 2009

(54) QUALITY ENHANCEMENT SYSTEMS AND METHODS FOR TECHNICAL DOCUMENTATION

(75) Inventor: Roy Hirst, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 449 days.

(21) Appl. No.: 10/727,694

(22) Filed: Dec. 4, 2003

(65) Prior Publication Data

US 2005/0125422 A1  Jun. 9, 2005

(51) Int. Cl.
*G06F 17/30* (2006.01)
(52) U.S. Cl. .......................... 715/234; 715/209; 707/4; 707/5
(58) Field of Classification Search ................ 715/500, 715/234, 209; 707/4, 5
See application file for complete search history.

(56) References Cited

U.S. PATENT DOCUMENTS

| 5,239,617 | A |   | 8/1993 | Gardner et al. | |
|---|---|---|---|---|---|
| 6,021,403 | A | * | 2/2000 | Horvitz et al. | 706/45 |
| 6,233,570 | B1 |   | 5/2001 | Horvitz et al. | |
| 6,601,075 | B1 |   | 7/2003 | Huang et al. | |
| 6,687,677 | B1 |   | 2/2004 | Barnard et al. | |
| 6,785,671 | B1 | * | 8/2004 | Bailey et al. | 707/3 |
| 2002/0123915 | A1 | * | 9/2002 | Denning et al. | 705/7 |
| 2003/0097357 | A1 | * | 5/2003 | Ferrari et al. | 707/3 |
| 2003/0126559 | A1 | * | 7/2003 | Fuhrmann | 715/513 |
| 2004/0205448 | A1 | * | 10/2004 | Grefenstette et al. | 715/500 |

OTHER PUBLICATIONS

Levine, et al., "WordPerfect 6.1 for Windows for Dummies," Second Edition, IDG Books Worldwide, Inc., copyright 1994, title page, copyright page, and chapter 7: "Spelling, Grammar, and the Mighty Thesaurus".*
Hubertus Hohl, 'Hypadapter: An Adaptive Hypertext System for Exporatory Learning and Programming', published 1996, pp. 131-156.*
B. Krulwich. Learning User Interests Across Heterogeneous Document Databases. In Proc. of AAAI Spring Symp. On Information Gathering from Heterogeneus, Distributed Environments, 1995. 5 pages.

* cited by examiner

*Primary Examiner*—Stephen S Hong
*Assistant Examiner*—Matthew J Ludwig
(74) *Attorney, Agent, or Firm*—Workman Nydegger

(57) ABSTRACT

The present invention relates to a system and methodology to facilitate automated quality management and controls for one or more items appearing in a documentation set. Respective items are analyzed in accordance with a plurality of quality metrics that can be tracked according to an automated identification process. A system is provided that facilitates quality measurements of data and/or documents appearing in a documentation set, collection or database. A quality component tracks one or more quality metrics associated with the items, wherein the items can include topics, subtopics, or other categories. A rules engine automatically applies the quality metrics to the items to facilitate interactive quality assessments of the items, wherein a scoring component automatically ranks the items based at least in part on the interactive quality assessments of the items.

14 Claims, 9 Drawing Sheets

QUALITY ENHANCEMENT SYSTEMS AND METHODS FOR TECHNICAL DOCUMENTATION

TECHNICAL FIELD

The present invention relates generally to computer systems, and more particularly to a system and method that combines automated rule-based and interactive quality review methods to create and maintain quality measures across large documentation sets.

BACKGROUND OF THE INVENTION

Software development has emerged as one of the most rapidly changing areas of technological advancement. From room-sized computing systems of yesterday to the high performance desktop or portable machines of today, development platforms along with associated development environments continually change in response to technological innovation. One area where these changes are readily apparent is in the software development industry, wherein computer systems designers and architects often have a plurality of tools at their disposal in order to create a desired application. These tools can include hardware assets such as personal computers, emulators, traffic or network analyzers, and other instruments to aid in software component design. Software development tools can be even more numerous. For example, such tools can include development platforms, compilers, linkers, assemblers, debuggers, modelers, and other tools in addition to a plurality of different programming language environments that may be required for various design problems.

Each of the respective tools described above can include a plurality of differing functionality. Thus, in order to become proficient with a given tool, programming language, or development environment, one must become acclimated with the technical terminology associated with the respective tool in order to properly utilize and exploit underlying features of the tool. In one example, many operating system environments offer software packages known as development platforms or "studios." These platforms may also include support for various programming languages such as Visual Basic, C++, Java, C#, J#, and XML to name but a few examples.

Along with which language is selected for development, software designers often have to consider and design for a particular runtime environment. For example, in previous generation operating systems, objects were responsible for managing object lifetimes such as via techniques known as reference counting. Object communications were often achieved via such models as the Component Object Model (COM). Newer virtual machine environments can now automatically manage object lifetime such as through employment of a system garbage collector to reclaim an object that is no longer being accessed. These systems can also more seamlessly integrate with Web type developments such as via XML protocols, Simple Object Access Protocols (SOAP), and Web Services Description Language (WSDL), for example.

Other design issues involve runtime code generation considerations that may include aspects relating to Just-in-Time (JIT) compilation techniques. Such techniques can include late bound calls that are found in languages such as Visual Basic, ECMAScript, Python, Perl, PHP, Scheme, Ruby, and so forth. In these languages, the types of a receiver and arguments of a method call are generally not known statically, whereas managed system method call instructions (e.g., call, callvirt, ldftn, ldvrtftn) require respective static types of the method arguments and result. Hence, a method dispatch is performed dynamically based on the runtime types of the receiver, actual arguments, and the static name of the method. This interpretative layer is one of the main reasons that late bound languages do not perform as well as statically typed languages. As can be appreciated, the above tools, languages, design, and associated runtime considerations are too numerous to outline. Thus, forming an understanding of all the various components and interactions in a typical development environment remains a constant and complicated challenge—even for the most experienced of designers.

In view of the above, with the increasing abstraction of high-level programming languages and the trend towards language-independent objects that allow frequently-needed functionality to be readily accessed and re-used, it is becoming more difficult to measure and to improve the quality of technical documentation associated with software development processes.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to systems and methods that facilitate automated and interactive quality controls that are automatically applied to technical documentation. For technical documentation, quality is generally a measurable function of document accuracy, document content scope, and document discoverability. For software development documentation, previous methods of technical documentation have focused on technical accuracy even though document content scope and document discoverability are likely more accurate predictors of final document usefulness. The systems and methods of the present invention provide automated and interactive processes that facilitate repeatable document quality scores and enable rapid document remediation.

Automated tools are provided that enable owners of a documentation set to measure the quality of a document, increase document quality, and/or track document quality measurements on an ongoing basis across the documentation set. By combining automated rule-based and interactive quality review methods, the present invention creates and maintains quality measures across large documentation sets (e.g., 30,000 documents or more). In one aspect, this is achieved via an interactive tool that automatically applies rule-based (or other type) quality measures to a documentation set or collection having one or more items. The tool enables interactive quality assessment of the items in the set and allows for bulk remediation of common quality problems across groups of documents within the set.

In one aspect of the present invention, a quality analyzer is provided that measures and/or controls quality for one or more items in the documentation set. A rules engine interprets the items in view of one or more quality metrics by applying the metrics to the items in order to determine perceived problems (or benefits) with the items, facilitate remediation of the problems, and/or replicate beneficial insights across the set. The metrics can include combinations of positive and/or corrective feedback from users or administrators of the documentation set that can be automatically scored to determine the nature of the problem and to enable automated remedial actions to be taken in order to improve the quality of the documentation set. For example, negative or corrective feedback can include analyzing metrics such as ambiguous, imprecise, or unclear wording in a document or indicate a minor problem such as a spelling error. An example of positive feedback can include metrics such as this topic is good or useful.

Based on the respective feedback, the positive and/or corrective commentary can be automatically categorized and scored according to document content type and topics appearing in the content. Along with correcting identified problems in the documentation set, a broader analysis can occur and applied to increase the overall quality of the set. For example, it may be statistically determined that introductory subject matter is much more likely to be accessed and scrutinized by respective users of the documentation. Thus, commentary received regarding introductory type topics or subject matter can be analyzed and applied in a uniform manner across other items in the set that also may have topics associated with this type subject matter. In this manner, the overall quality of the documentation set can be improved.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

DETAILED DESCRIPTION OF THE INVENTION

The present invention relates to a system and methodology to facilitate automated quality management and controls for one or more items appearing in a documentation set. Respective items are analyzed in accordance with a plurality of quality metrics that can be tracked according to an automated identification process. A user interface and interactive tool are provided for receiving feedback from administrators/users, tracking quality issues across a database in response to the feedback, applying and displaying scores to the items to facilitate quality assessments, and mapping quality assessments across the documentation set to facilitate raising item quality collectively across the data set.

Filters can be provided for analyzing quality scores in view of predetermined thresholds to identify items or topics having suitable quality standards and thus can be analyzed and subsequently applied to other items in the database (e.g., lessons or rules learned from improved item applied to subsequent items).

In one aspect, a system is provided that facilitates quality measurements of data and/or documents appearing in a documentation set, collection or database. A quality component tracks one or more quality metrics associated with one or more items, wherein the items can include topics, subtopics, or other categories. A rules engine automatically applies the quality metrics to the items to facilitate interactive quality assessments of the items, wherein a scoring component automatically ranks the items based at least in part on the interactive quality assessments of the items.

As used in this application, the terms "component," "object," "analyzer," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Figure 1:
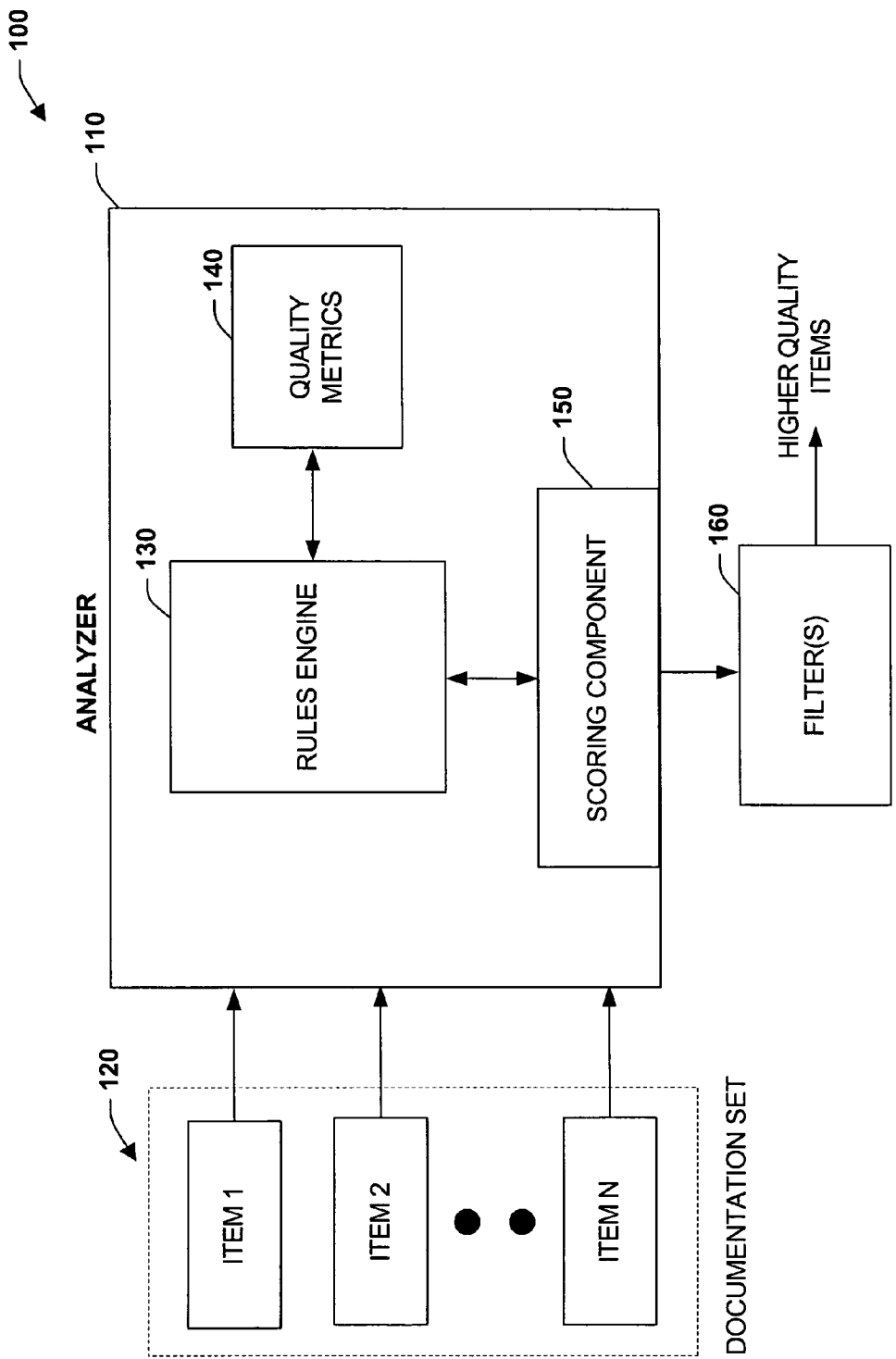
FIG. 1 is a schematic block diagram of a quality analyzer in accordance with an aspect of the present invention.

Referring initially to FIG. 1, a quality analyzer system 100 is illustrated in accordance with an aspect of the present invention. The system 100 includes a quality analyzer 110 that measures and/or controls quality for one or more items 120 in a documentation set (or sets). The analyzer 110 can be associated with a local tool or interface and/or can be provided as a service such as via a web site (or sites), for example. Respective items 120 can be stored in a local database, remote database, and/or combination of remote or local databases that interact with the analyzer 110. Also, the items 120 (and data associated therewith) can be communicated across local and/or remote networks such as the Internet, for example. A rules engine 130 interprets the items 120 in view of one or more quality metrics 140 by applying the metrics to the items in order to determine perceived problems (or benefits) with the items, facilitate remediation of the problems (within the item or across the set), and/or replicate beneficial insights across the set.

The quality metrics 140 can include combinations of positive and/or corrective feedback from users of the documentation set that can be automatically scored or ranked by a scoring component 150 to determine the nature of the problem with the items 120 and to enable automated remedial actions to be taken in order to improve the quality of the documentation set. The scoring component 150 can also be associated with interface or feedback elements from users or administrators that aggregate comments or selections from users. In one example, negative or corrective feedback can include analyzing metrics such as ambiguous, imprecise, or unclear wording in a document or indicate a minor problem such as a spelling error. An example of positive feedback can include metrics such as this topic is good or useful. Other metrics 140 can include a bug exists with an identified technology, a code snippet is malfunctioning, information has been supplied in an unsuitable manner, information poorly organized, not enough information has been supplied with a topic, and so forth.

One or more filters 160 can be provided for analyzing quality scores from the scoring component 150 in view of predetermined thresholds that identify items or topics having suitable quality standards and thus can be analyzed and subsequently applied to other items in the database (e.g., automatically apply lessons or rules learned from improved item or items to subsequent items). For example, it may be determined by the rules engine 130 that pseudo code examples are most often referred to by code developers and in general receive positive ratings in accordance with the quality metrics 140. Thus, in general, the scoring component in view of the positive ratings can assign a higher score to items or topics that are so rated (e.g., based upon a statistical analysis of quality metrics applied to item). The filter 160 may have a predetermined threshold set up such that scores for an item 120 that exceed the threshold (e.g., scores above 60) invoke automated procedures such as tagging the item to indicate a beneficial quality associated with the item that can merit replication of the beneficial quality throughout (or potions) of the documentation set. Likewise, scores below the threshold can indicate corrective actions that may be similarly distributed in or applied to the documentation set.

Based on feedback received by the analyzer 110, positive and/or corrective commentary can be automatically categorized and scored according to document content type and topics appearing in the content. Along with correcting identified problems in the documentation set, a broader analysis can occur and applied to increase the overall quality of the set. For example, it may be statistically determined that introductory subject matter is much more likely to be accessed and scrutinized by respective users of the documentation. Thus, commentary received regarding introductory type topics or subject matter can be analyzed and applied in a uniform manner across other items in the set (e.g., add introductory paragraph to pseudo code examples) that also may have topics associated with this type subject matter. In this manner, the overall quality of the documentation set can be improved.

It is noted that the rules engine can include a plurality of rules for analyzing the quality metrics 140 and respective items 120. These can be rules that follow an if/then construct, or rules structured according to a programmatic analysis. For example, one rule could state, "For a detected spelling error, subtract some percentage from quality rating or score for document, check other documents of similar type for spelling error." In another example, "For a positive comment, add some percentage to score, categorize the comment, replicate functionality related to comments to other items in the document set if possible." In addition to rules for analyzing metrics, items, and/or scores, other models may be applied. Such models can be automatically constructed from learning algorithms or learning components. This may also include artificial intelligence techniques, automated classification methods, inference analysis, probability analysis, statistical processing, and components such as neural networks. For example, learning algorithms can include employment of classifiers that are configured to analyze associated attributes of quality terms, metrics, topics, and/or vocabulary, wherein a feature vector assigns a weight or value to the attribute or metric based upon learning processes applied to training members or data of the attribute's class or topic. Classifiers can be stated as a function that maps an input attribute to the confidence that the input belongs to a class and can include such techniques as Support Vector Machines (SVM), Naive Bayes models, Bayes networks, decision trees, similarity-based models, vector-based models, Hidden Markov Models and/or other learning models or combinations thereof.

It is to be appreciated that other decision-theoretic analysis can also be employed in conjunction with learning algorithms to analyze metrics and items and subsequently apply the analysis to the documentation set. For example, this may also include analyzing extrinsic evidence or data of a user's present context state, and interpreting information in accordance with the data. Such data can include evidence of keyboard activities, mouse movements, microphone inputs, camera inputs and substantially any indication of the user's activity such as time and electronic calendar information relating to the user's activity (e.g., automatically retrieve information if the user appears to be hovering over a particular item indicating non-understanding or detecting a sigh of exasperation with a particular item or topic).

Figure 2:
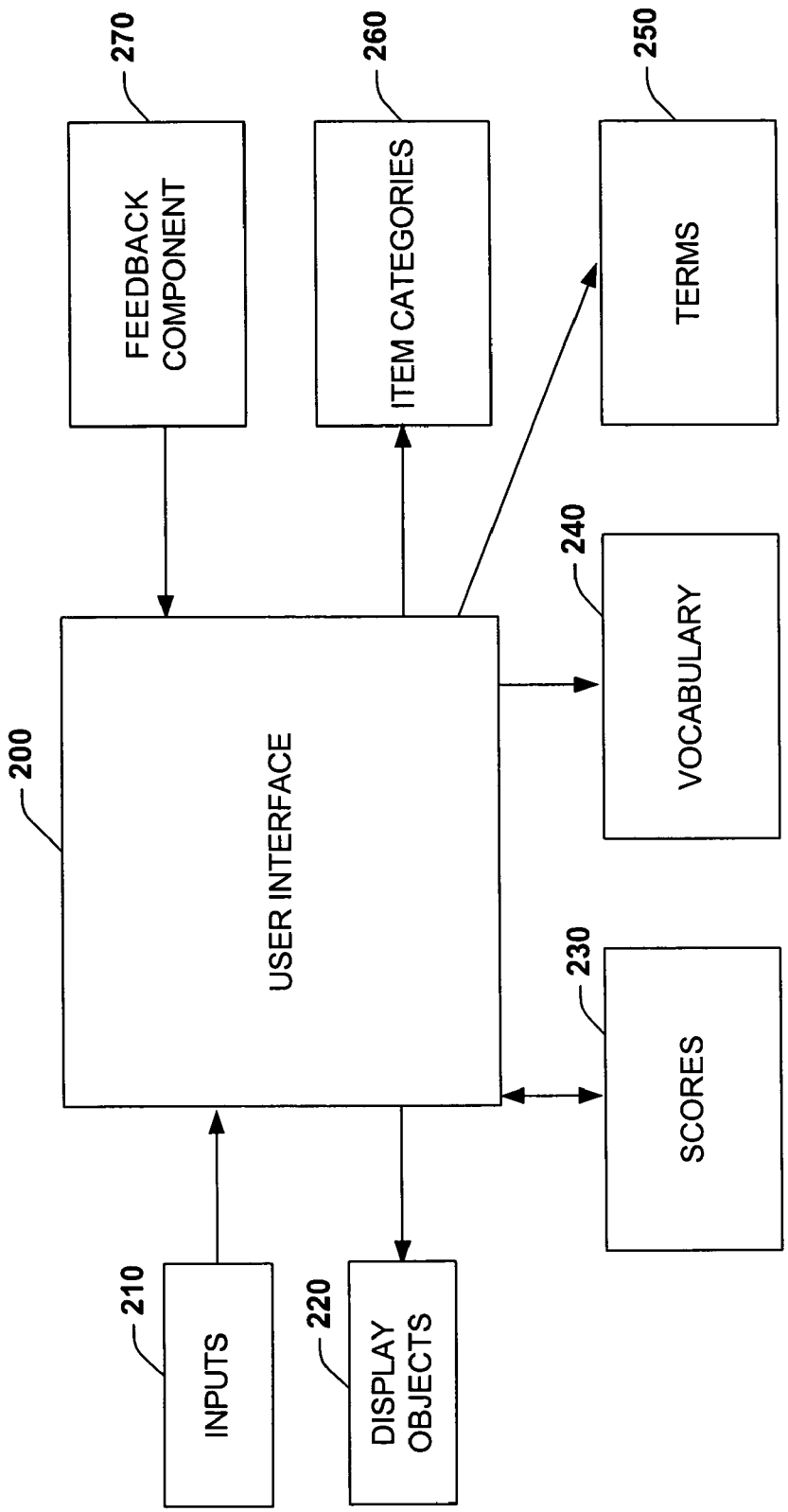
FIG. 2 is a flow diagram of a quality user interface in accordance with an aspect of the present invention.

Referring now to FIG. 2, a quality user interface 200 is illustrated in accordance with an aspect of the present invention. The interface 200 can be provided as an administrative tool to enable items in a documentation set to be analyzed, scored, viewing scored results, and to tag items for further quality actions such as to perform no action, revise an item, replace an item, and so forth. Items can also be viewed according to a tag, topic or category in order that collective or aggregated information associated with the documentation set can be analyzed and/or modified. As illustrated, the user interface 200 can include one or more inputs 210 for controlling various quality aspects of the present invention and one or more display objects 220 for receiving and analyzing quality results of the documentation set.

The display objects 220 can include such aspects as configurable icons, buttons, sliders, input boxes, selection options, menus, tabs and so forth having multiple configurable dimensions, shapes, colors, text, data and sounds to facilitate operations with the interface 200. In addition, the user inputs 210 can also include a plurality of other inputs or controls for adjusting and configuring one or more quality aspects of the present invention. This can include receiving user commands from a mouse, keyboard, speech input, web site, browser, remote web service and/or other device such as a microphone, camera or video input to affect or modify operations of the user interface 200.

The interface 200 includes a scores component 230 to view scores associated with an item, and/or to manually or automatically compute and apply scores to items based upon collected or aggregated information (e.g., user/administrator feedback) for the item. At 240, a vocabulary component provides words or terms that are related to common industry terms for a respective technology or category associated with an item. At 250, terms employed by developers of a technology for an item can be displayed. The terms 240 and 250 can be employed to facilitate an analysis of technical content and/or quality of information displayed for a particular item. At 260, one or more item categories can be provided that display topics and subtopics within an item along with corresponding scores and quality information illustrating the overall quality of the topic. At 270, a feedback component is provided to enable administrators or other systems to tag an item or category for further quality actions such as perform no action, category contains wrong information, not enough information for a category, and so forth. Such feedback can be employed to improved quality on the selected topic and further analyzed for possible deployment to other items and categories.

Figure 3:
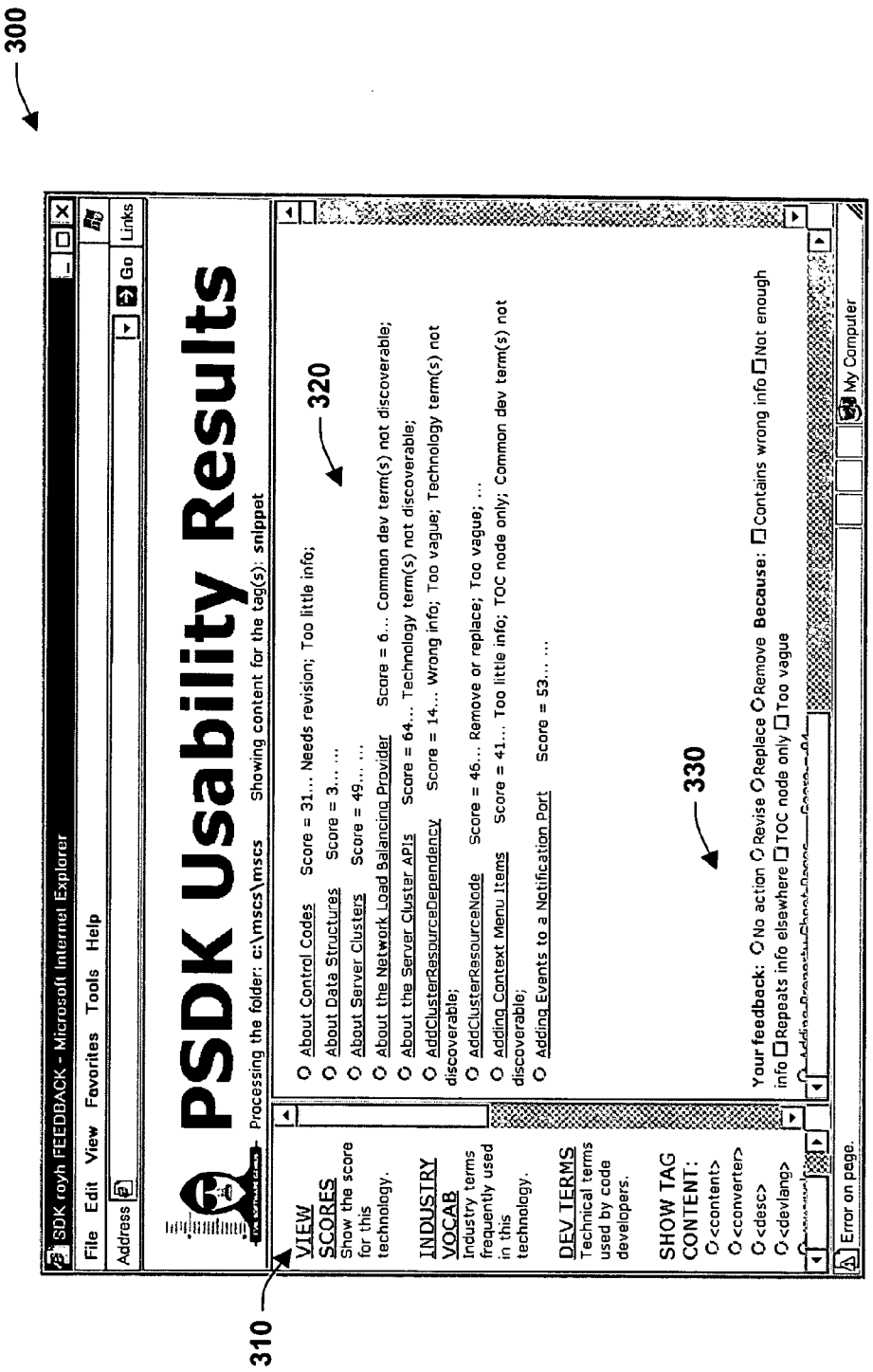
FIG. 3 is a diagram illustrating an exemplary quality interface in accordance with an aspect of the present invention.

Turning to FIG. 3, an exemplary quality interface 300 is illustrated in accordance with an aspect of the present invention. The interface 300 is depicted as one particular example of the interface described above with respect to FIG. 2. It is to be appreciated that various other interface displays and/or options can be similarly provided. In this example, a side pane 310 enables administrators or users to view scores for a selected item or technology, view common industry terms that are frequently employed for a selected technology, and view developer terms that may apply to the selected technology. Also, a selection can be provided for displaying content associated with a selected tag (e.g., content, converter, description, developer language, and so forth). At 320, topic information associated with an item can be selected (e.g., hyperlink) and displayed, wherein corresponding scores for the topic information can also be displayed. At 330, various feedback selections enable administrators (or systems) to indicate further quality actions that may need to be taken and respective reason selections for taking the action (e.g., revise this topic because it repeats similar information elsewhere in the documentation set).

Figure 4:
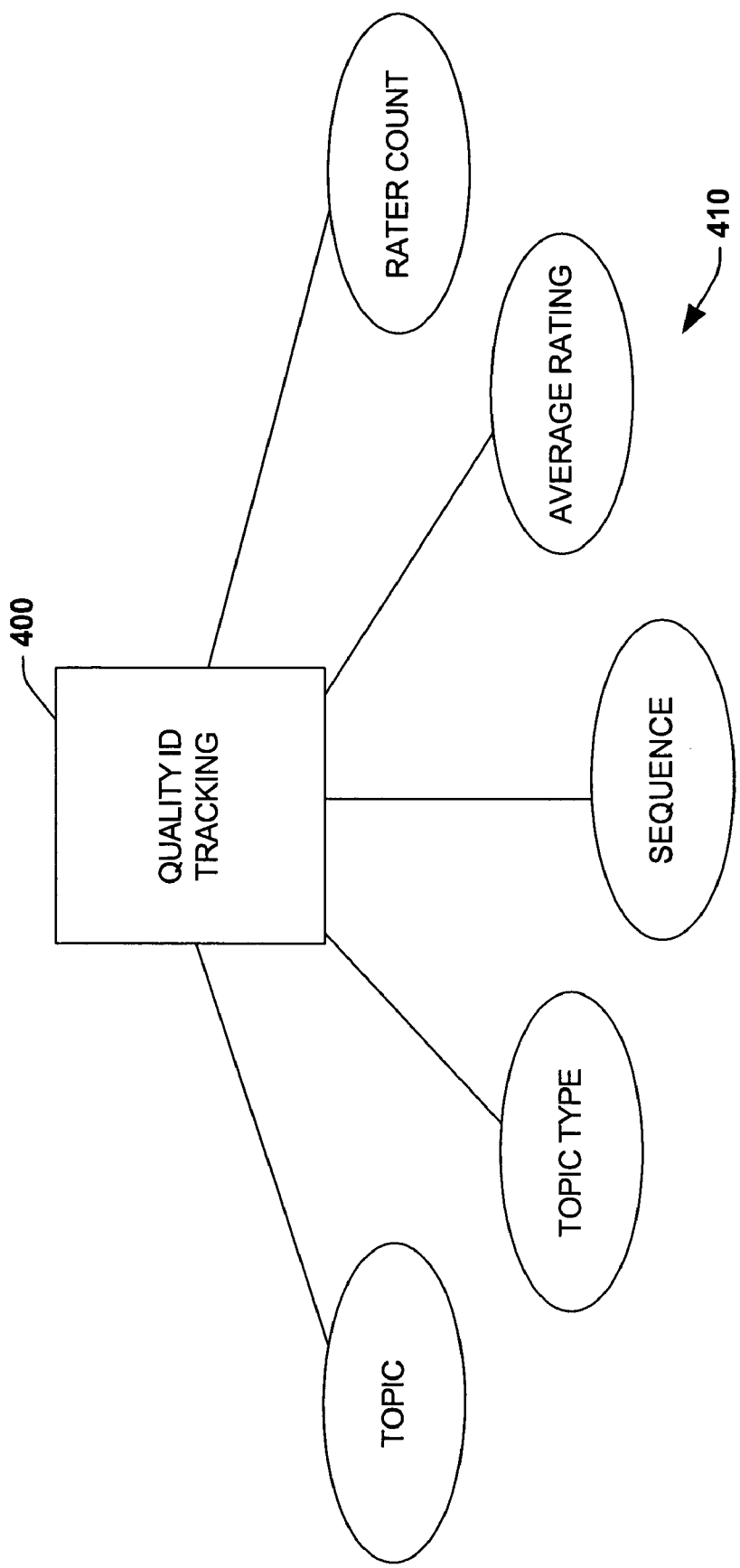
FIG. 4 is a diagram illustrating a quality tracking component in accordance with an aspect of the present invention.

FIG. 4 illustrates an exemplary quality tracking component 400 in accordance with an aspect of the present invention. The quality tracking component 400 can be associated with an electronic identifier such as a Globally Unique Identifier (GUID), for example, to track quality measurements. The ID's facilitate that quality measurements are reconcilable to the documents referred to, even if other document identifiers such as title and document location are modified. Thus, GUID schemes provide a unique ID for substantially any document published for a documentation set from substantially any source. Information that can be tracked with the ID is illustrated at 410 and can include such items as an item topic, topic type (e.g., information related to using a technology as opposed to reference information), a sequence number for the respective topic, a rating or score for the item, and a count field relating to the number of users or administrators that have submitted feedback for a particular topic. The following table illustrates an example data structure for ID's and associated information:

| GUID | Topic | Topic type | Seq.# | Average for this technology 5.7 Average Rating | Rater count |
|---|---|---|---|---|---|
| 47247d48-d401-41dc-9aae-128840eb6d3a | mscs.windows_clustering | 1-About | 1 | 1 | 2 |
| 36ff3433-4ace-4d06-8940-d2e999d797bb | mscs.server_cluster_apis_start_page | 1-About | 2 | 9 | 2 |
| 70abecc3-2e10-466c-9ccf-4c7e93ec621f | mscs.quick_start | 1-About | 3 | 9 | 1 |
| b7007e2c-248a-4cb9-b23e-6bf242bc7141 | mscs.what_s_new | 1-About | 4 | | |
| ea6b6286-cb96-49fe-8412-febb81111b20 | mscs.what_s_new_in_windows_2000 | 1-About | 5 | | |
| 2ecdf123-7333-460f-bf9e-1732597a6a97 | mscs.finding_what_you_need | 1-About | 6 | | |
| 8bf3afe5-99eb-4fa5-ae79-458062ab37aa | mscs.server_cluster_prerequisites | 1-About | 7 | | |
| f77823ca-39b4-423a-819b-62ea9ea950bf | mscs.further_information | 1-About | 8 | | |
| 093c8ef3-43e3-4d7b-9789-4958b4dbe041 | mscs.about_the_server_cluster_apis | 1-About | 9 | 6 | 2 |
| fd0ebc00-9839-48cc-ad35-3e84cda213e7 | mscs.about_server_clusters | 1-About | 10 | | |
| daec0128-5ae1-4eea-ad6a-77b633523dd6 | mscs.high_availability | 1-About | 11 | | |
| 052c0dcc-4157-430e-a42c-6c7ebae70c85 | mscs.server_cluster_implementation | 1-About | 12 | 4 | 1 |
| 1c20dbc0-ee8b-4c91-8d09-eaa4bf983362 | mscs.preparing_a_development_environment | 2-Using | 99 | | |
| 72bc0f51-5747-43a6-b15f-79a02556b08b | mscs.using_the_inline_examples | 2-Using | 100 | | |
| 54be1f85-4593-4c4a-a8f2-176bfa86f188 | mscs.index_of_examples | 2-Using | 101 | | |
| fc2032d2-40a5-45bd-8661-1e778789bad6 | mscs.clusdocex_h | 2-Using | 102 | | |
| f8f0297a-c050-41b9-a52f-a0265a18b87a | mscs.using_lists_and_tables | 2-Using | 103 | | |
| f3dab9b3-c06b-4838-9a29-6a43fa3b15f6 | mscs.using_clusprop_buffer_helper | 2-Using | 104 | | |
| 9efe1457-72ab-4e9a-9d92-128e206b0fb3 | mscs.building_with_clusprop_buffer_helper | 2-Using | 105 | | |
| 83239274-f3c1-463a-b91d-13db6da86846 | mscs.parsing_with_clusprop_buffer_helper | 2-Using | 106 | | |
| 92a0e739-b547-4b49-ba79-ac6962f2d276 | mscs.using_value_lists | 2-Using | 107 | | |
| 7af7f5a8-fe1f-4b2a-9332-fd2cefc18cc2 | mscs.creating_value_lists | 2-Using | 108 | | |
| 3504b04d-9b96-4b44-a8ae-f5e5eb8231d8 | mscs.parsing_a_value_list | 2-Using | 109 | | |
| 61bbda33-da5f-4826-b52a-e45252ac0374 | mscs.using_parameter_blocks | 2-Using | 110 | | |
| 0b1306d1-b1b4-49c3-8163-73078f5b19cf | mscs.building_property_tables | 2-Using | 111 | | |
| 6cafd61f-9506-4417-90bd-a9d2de9cf55b | mscs.using_property_lists | 2-Using | 112 | | |
| 15d08ce0-070a-47cd-bf0c-71fdc98d6d7f | mscs.creating_property_lists | 2-Using | 113 | | |
| fde017dc-fcc8-4b34-a56a-85f052306569 | mscs.parsing_property_lists | 2-Using | 114 | | |
| 709effda-5ff1-439e-805a-9169ca63c182 | mscs.using_object_handles | 2-Using | 115 | | |
| 13fab046-0e1e-48f0-a2b1-f57b582e7a74 | mscs.control_code_reference | 3-Reference | 208 | 8 | 1 |
| 89ae667e-6ad9-453e-b370-b3d6a67172a2 | mscs.control_code_functions | 3-Reference | 209 | | |
| 7ef06c95-8d9d-4b87-a6d8-d6a2d49523ee | mscs.clustercontrol | 3-Reference | 210 | 9 | 1 |
| 72896685-a1db-43d7-a5e3-ba380c0624f2 | mscs.clustergroupcontrol | 3-Reference | 211 | | |

Figure 5:
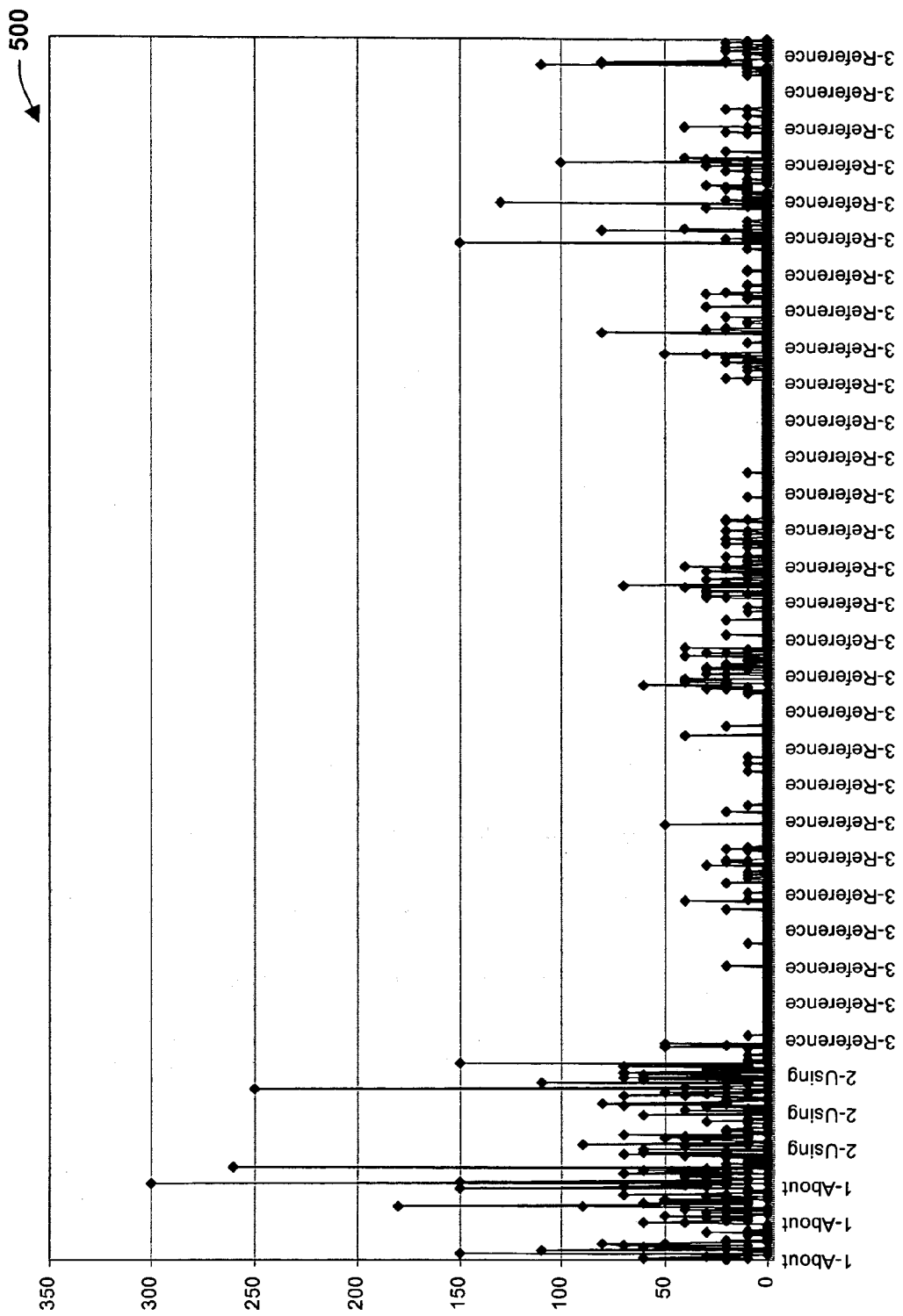
FIG. 5 is a diagram illustrating a quality analysis display in accordance with an aspect of the present invention.

FIG. 5 illustrates an exemplary quality analysis display 500 in accordance with an aspect of the present invention. The display 500 tracks results of measuring actual online access to a documentation set over a calendar month. The vertical axis shows the number of online references per month to topics in a 1500-topic technical reference publication collection. The horizontal axis shows the topics in the collection in the order in which they appear in the table of contents (TOC) (other orderings possible). The chart illustrates that topics in the first quarter of the TOC—explanatory topics, in this case—attract significantly more reader interest than topics—reference topics—in the remainder of the body of the collection. For a technical reference publication, these measurements appear counter-intuitive (e.g., expect more interest in detailed topic specification than explanatory topic) and thus, can lead to a re-direction of quality efforts for such publications.

Figure 6:
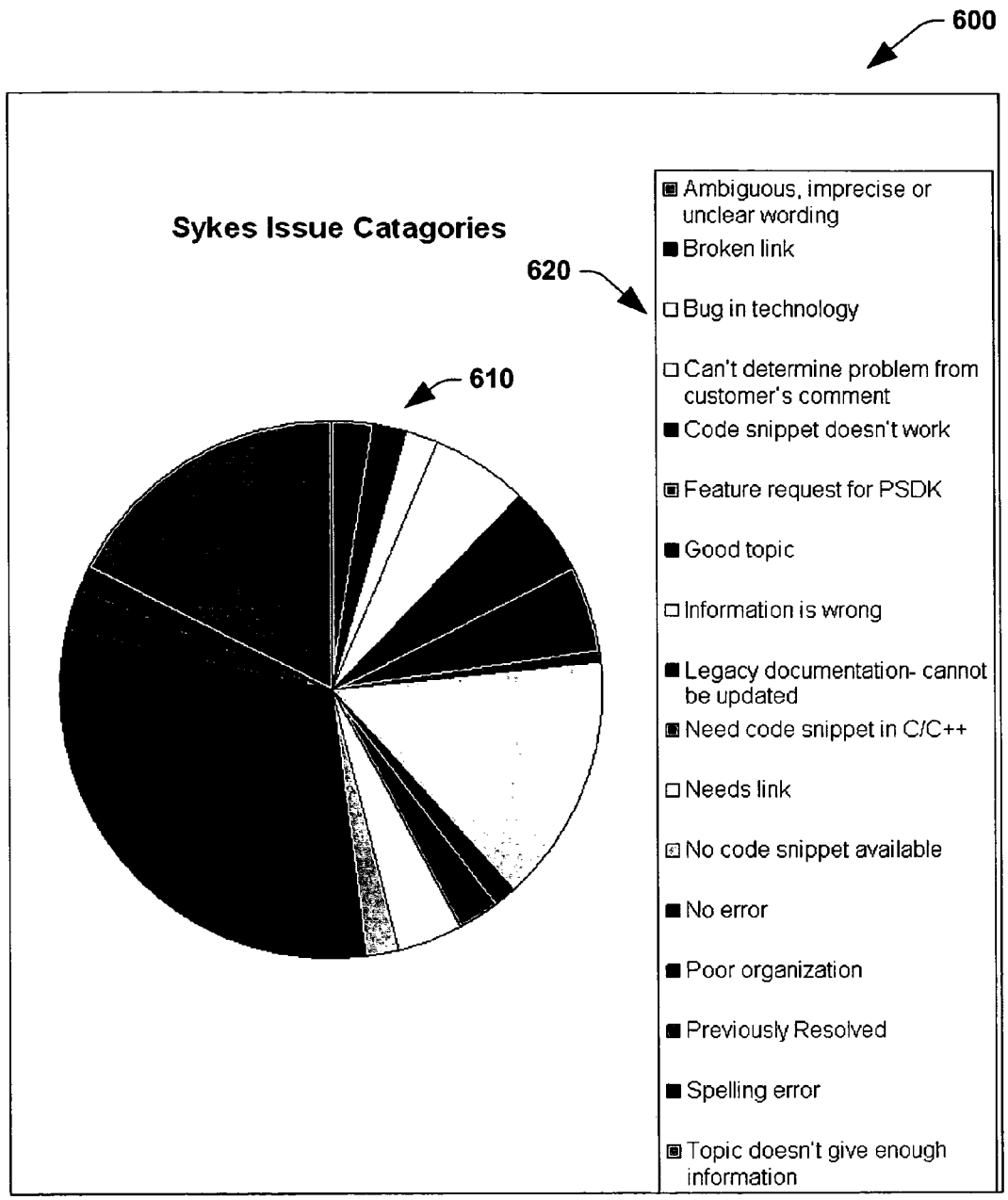
FIG. 6 is a diagram illustrating a quality metrics display in accordance with an aspect of the present invention.

FIG. 6 illustrates an exemplary quality metrics display 600 in accordance with an aspect of the present invention. In this aspect, a pie chart 610 illustrates various quality issues and a graphical depiction of the weighting or frequency of an issue. At 620, color-coded metrics are issued to correlate with the chart 610. For example, these metrics may include ambiguous, imprecise, or unclear wording, a broken hyperlink, a bug reported in a technology, an undetermined problem, a code portion not working, a feature request, a useful topic, information is incorrect, legacy documentation that cannot be updated, need code example in a subsequent programming language, need an associated link, code example not available, no error found, poorly organized information, previously resolved issue, spelling error, not enough information provided for a topic. As can be appreciated a plurality of such quality designations or metrics can be provided.

Figure 7:
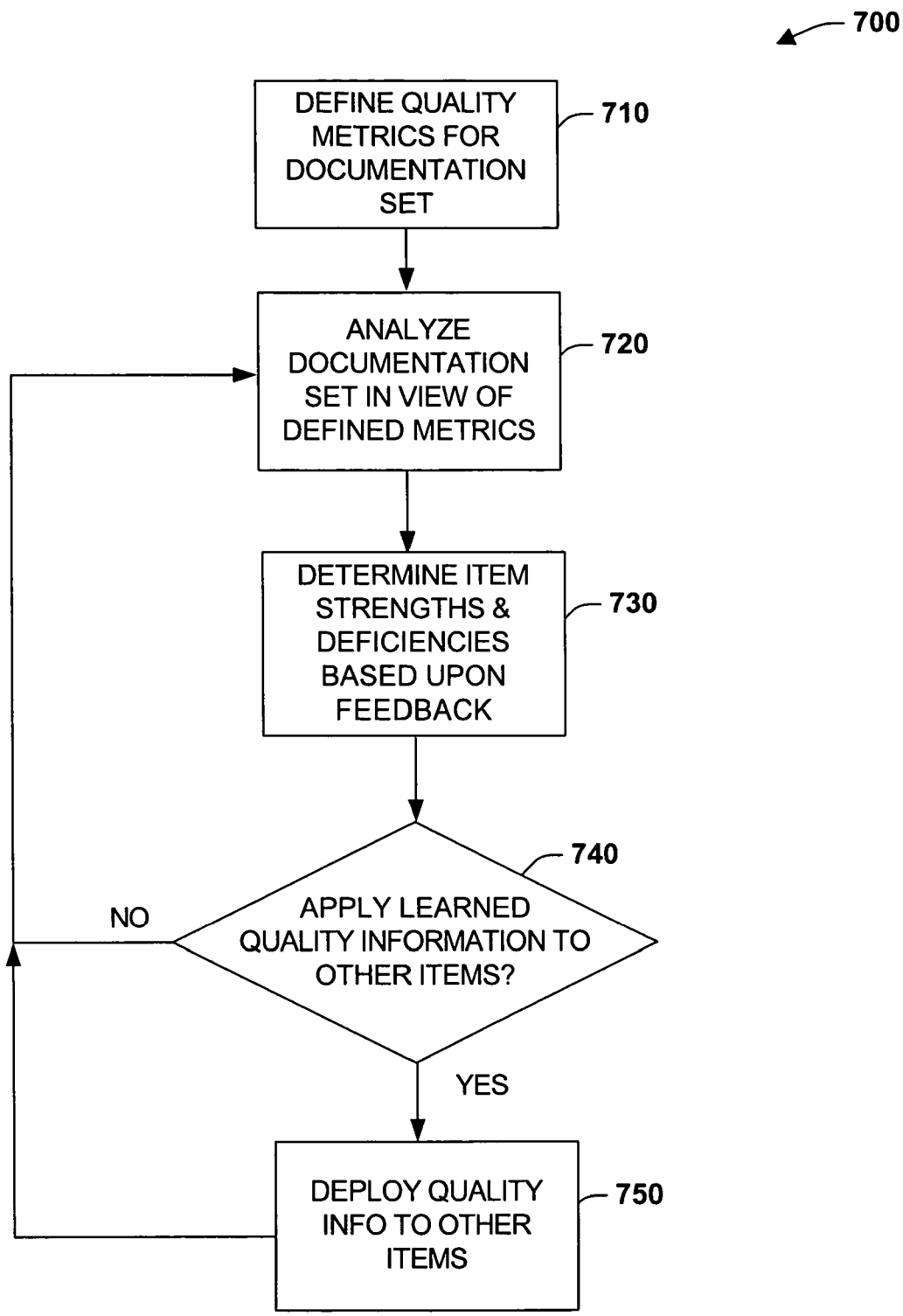
FIG. 7 is a flow diagram illustrating a quality measurement process in accordance with an aspect of the present invention.

FIG. 7 is a flow diagram illustrating a quality measurement process in accordance with an aspect of the present invention. While, for purposes of simplicity of explanation, the methodology is shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

FIG. 7 depicts an automated quality measurement process 700 in accordance with an aspect of the present invention. At 710, one or more quality metrics are defined for a respective documentation set. As noted above, such metrics can include a plurality of differing criteria in which performance of a technical documentation set can be measured. At 720, the documentation set is automatically analyzed in view of the defined metrics of 710. This can include such aspects as measuring the frequency of a particular feature or corrective action and plotting the results of the measurements to determine further actions. Topics within an item can be measured to determine if one type of item exhibits a characteristic or type that warrants further consideration. For example, it may be determined that introductory type topics contain more value for readers than detailed technical reference material. At 730, item strengths and deficiencies are determined by analyzing the documentation set over time and in view of feedback that may be received from users and or administrators of the set.

At 740, based upon the above analysis, a decision is performed to determine whether or not to apply learned or analyzed quality information to other items in the documentation set. For example, if a one-time occurrence of an error in documentation is detected, the error may be corrected without further consideration given to the documentation set. On the other hand, if it is determined that explanatory topics are generally rated or scored as not supplying enough examples, then it may be determined to add more examples to other explanatory items in the documentation set even if the respective items had no corresponding data that indicated such deficiency. Thus, if no further deployment of quality information is to occur at 740, the process proceeds back to 720 and continues to analyze the documentation set in view of defined metrics. Otherwise, the process proceeds to 750 to deploy learned or determined quality information to other items in the set. As can be appreciated, metrics can be added or changed over time within the process 700.

Figure 8:
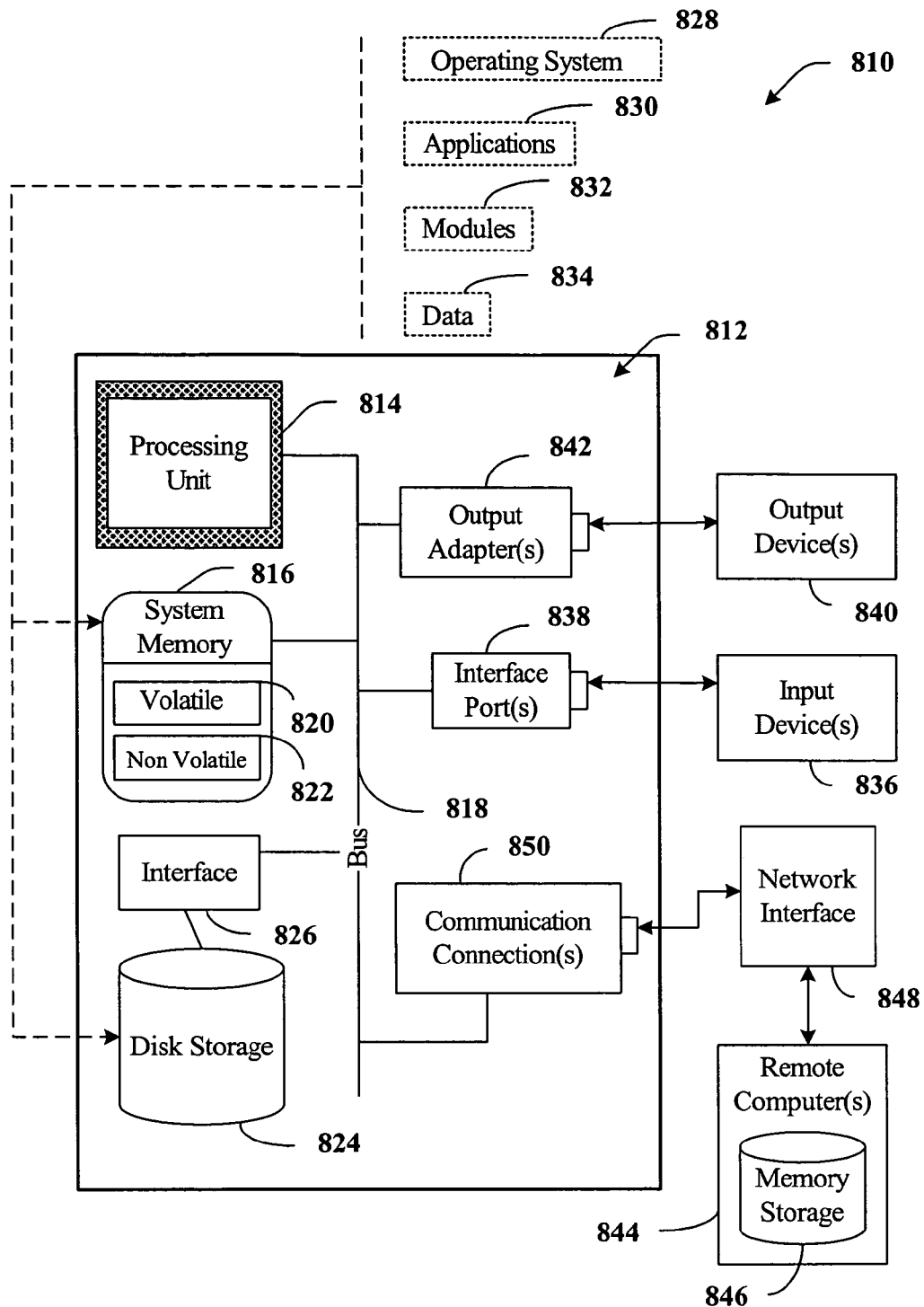
FIG. 8 is a schematic block diagram illustrating a suitable operating environment in accordance with an aspect of the present invention.

With reference to FIG. 8, an exemplary environment 810 for implementing various aspects of the invention includes a computer 812. The computer 812 includes a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814.

The system bus 818 can be any of several types of bus structure(s) including the memory bus or memory controller, a peripheral bus or external bus, and/or a local bus using any variety of available bus architectures including, but not limited to, 16-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 816 includes volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable ROM (EEPROM), or flash memory. Volatile memory 820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 812 also includes removable/non-removable, volatile/non-volatile computer storage media. FIG. 8 illustrates, for example a disk storage 824. Disk storage 824 includes, but is not limited to, devices like a magnetic disk drive, floppy disk drive, tape drive, Jaz drive, Zip drive, LS-100 drive, flash memory card, or memory stick. In addition, disk storage 824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 824 to the system bus 818, a removable or non-removable interface is typically used such as interface 826.

It is to be appreciated that FIG. 8 describes software that acts as an intermediary between users and the basic computer resources described in suitable operating environment 810. Such software includes an operating system 828. Operating system 828, which can be stored on disk storage 824, acts to control and allocate resources of the computer system 812. System applications 830 take advantage of the management of resources by operating system 828 through program modules 832 and program data 834 stored either in system memory 816 or on disk storage 824. It is to be appreciated that the present invention can be implemented with various operating systems or combinations of operating systems.

A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port may be used to provide input to computer 812, and to output information from computer 812 to an output device 840. Output adapter 842 is provided to illustrate that there are some output devices 840 like monitors, speakers, and printers, among other output devices 840, that require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a personal computer, a server, a router, a network PC, a workstation, a microprocessor based appliance, a peer device or other common network node and the like, and typically includes many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 850 refers to the hardware/software employed to connect the network interface 848 to the bus 818. While communication connection 850 is shown for illustrative clarity inside computer 812, it can also be external to computer 812. The hardware/software necessary for connection to the network interface 848 includes, for exemplary purposes only, internal and external technologies such as, modems including regular telephone grade modems, cable modems and DSL modems, ISDN adapters, and Ethernet cards.

Figure 9:
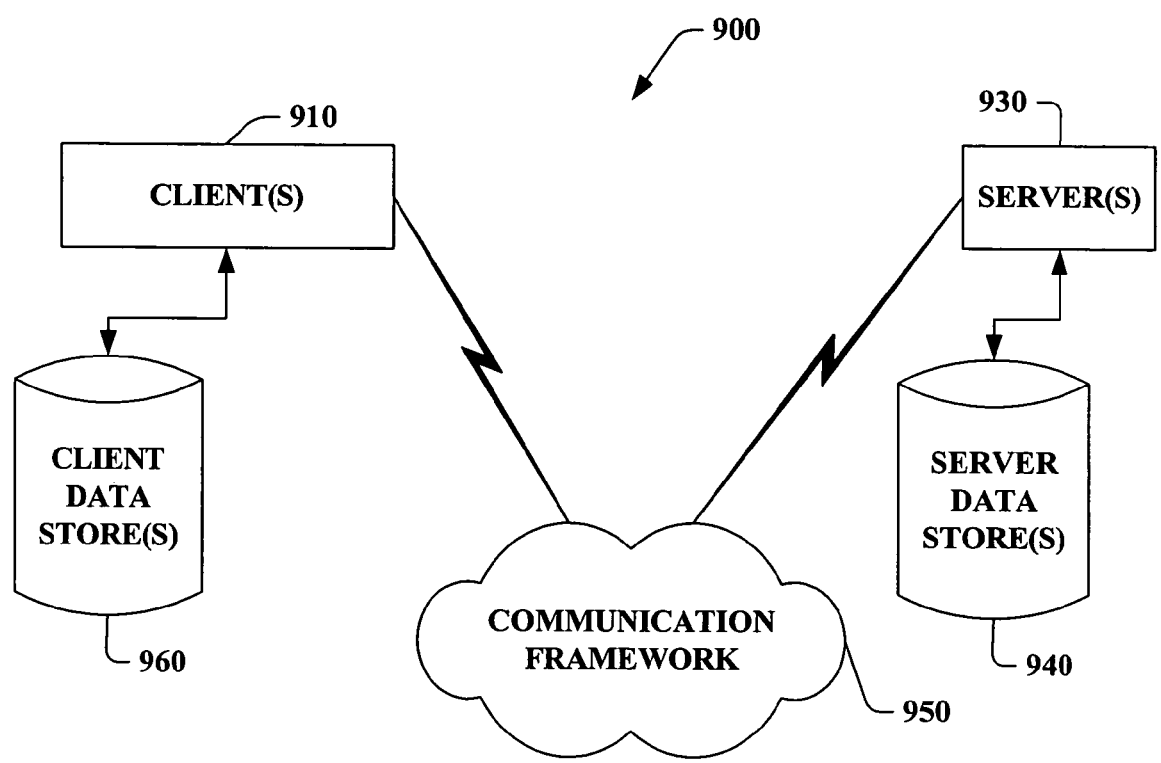
FIG. 9 is a schematic block diagram of a sample-computing environment with which the present invention can interact.

FIG. 9 is a schematic block diagram of a sample-computing environment 900 with which the present invention can interact. The system 900 includes one or more client(s) 910. The client(s) 910 can be hardware and/or software (e.g., threads, processes, computing devices). The system 900 also includes one or more server(s) 930. The server(s) 930 can also be hardware and/or software (e.g., threads, processes, computing devices). The servers 930 can house threads to perform transformations by employing the present invention, for example. One possible communication between a client 910 and a server 930 may be in the form of a data packet adapted to be transmitted between two or more computer processes. The system 900 includes a communication framework 950 that can be employed to facilitate communications between the client(s) 910 and the server(s) 930. The client(s) 910 are operably connected to one or more client data store(s) 960 that can be employed to store information local to the client(s) 910. Similarly, the server(s) 930 are operably connected to one or more server data store(s) 940 that can be employed to store information local to the servers 930.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates quality measurements of at least one of data or documents, comprising
a processor; and
memory storing instructions which, when executed by the processor, implement the following:
a quality component that tracks one or more quality metrics associated with one or more items in a documentation set, the one or more items include topics or subtopics, the one or more quality metrics tracked according to an automated identification process;
a rules engine that automatically applies the quality metrics to the items to facilitate interactive quality assessments of the items and bulk remediation of a quality problem across disparate items to improve the quality of the documentation set wherein quality is a measurable function of technical accuracy, document content scope, and document discoverability associated with the one or more items, the bulk remediation includes at least one of modifying or updating content of the one or more items;
a scoring component that automatically ranks the items based at least in part on the interactive quality assessments of the items, the scoring component ranks the one or more quality metrics associated with the quality of the one or more items to determine a nature of a problem with the one or more items; and
at least one filter that analyzes the ranks associated with the items and the quality metrics in view of a predetermined threshold of quality, the at least one filter extracts attributes from an item with a score that exceeds the predetermined threshold and automatically applies the attributes to the remaining items,
wherein the quality metrics include combinations of positive and corrective feedback from users of a documentation set which is automatically scored or ranked to determine a nature of an issue with the items and to enable automated remedial actions to be taken in order to improve quality of a documentation set.

2. The system of claim 1, the quality component is at least one of a local tool, an interface, and a service that communicates across at least one of local and remote networks and associated with at least one of a local database and a remote database.

3. The system of claim 1, the rules engine interprets the items in view of the quality metrics by applying the quality metrics to the items in order to at least one of determine perceived deficiencies or benefits with the items, facilitate remediation of the problems with the items, and replicate beneficial or corrective information across a document set.

4. The system of claim 1, further comprising a component to analyze issues across a documentation set and apply global controls to the documentation set based upon the analysis.

5. The system of claim 1, the rules engine includes a plurality of rules for analyzing the quality metrics and respective items.

6. The system of claim 5, the rules that follow an if/then construct or are structured according to a programmatic analysis.

7. The system of claim 5, the rules include at least one model for analyzing and applying quality information.

8. The system of claim 7, the model includes at least one of artificial intelligence techniques, automated classification methods, inference analysis, probability analysis, statistical processing, neural networks, classifiers that are configured to analyze associated attributes of quality terms, metrics, topics, or vocabulary, Support Vector Machines (SVM), Naive Bayes models, Bayes networks, decision trees, similarity-based models, vector-based models, Hidden Markov Models, and decision-theoretic models.

9. The system of claim 1, further comprising a user interface to analyze and process quality metrics, the interface including at least one of a score component, a feedback component, a terms component, a tag component and a category component.

10. The system of claim 9, the score component displays scores associated with an item and facilitates manually or automatically computing and applying scores to items based upon collected or aggregated information for the item.

11. The system of claim 9, the feedback component enables administrators or other systems to tag an item or category for further quality actions.

12. The system of claim 1, the items are associated with at least one of an electronic identifier, an item topic, a topic type, a sequence number for the item topic, a rating or score for the item, and a count field relating to the number of users or administrators that have submitted feedback for a particular topic.

13. The system of claim 12, the electronic identifier is a Globally Unique Identifier (GUID).

14. The system of claim 1, further comprising a display to track results of measuring online access to a documentation set over time.

* * * * *